(12) United States Patent
Moore et al.

(10) Patent No.: US 8,014,670 B2
(45) Date of Patent: Sep. 6, 2011

(54) METHOD AND APPARATUS FOR TESTING AND MONITORING DATA COMMUNICATIONS IN THE PRESENCE OF A COUPLER IN AN OPTICAL COMMUNICATIONS NETWORK

(75) Inventors: Brian Moore, Edmonton (CA); Stuart John Lomas, Edmonton (CA)

(73) Assignee: Bigbangwidth Inc., Alberta (CA)

( * ) Notice: Subject to any disclaimer, the term of this patent is extended or adjusted under 35 U.S.C. 154(b) by 710 days.

(21) Appl. No.: 12/049,827

(22) Filed: Mar. 17, 2008

(65) Prior Publication Data

US 2008/0225277 A1     Sep. 18, 2008

Related U.S. Application Data

(60) Provisional application No. 60/918,473, filed on Mar. 16, 2007.

(51) Int. Cl.
  *H04B 10/08*    (2006.01)

(52) U.S. Cl. ............... 398/33; 398/25; 398/16; 398/13; 398/28; 398/26; 398/27; 356/73.1

(58) Field of Classification Search ............... 398/9, 10, 398/13, 14, 16, 17, 20, 21, 25, 26, 27, 28, 398/30, 31, 32, 33, 34, 38, 177; 356/73.1
See application file for complete search history.

(56) References Cited

U.S. PATENT DOCUMENTS

| | | | |
|---|---|---|---|
| 5,285,305 A * | 2/1994 | Cohen et al. | 398/31 |
| 7,167,237 B2 * | 1/2007 | Shimizu et al. | 356/73.1 |

* cited by examiner

*Primary Examiner* — Hanh Phan
(74) *Attorney, Agent, or Firm* — Davis & Bujold, P.L.L.C.

(57) ABSTRACT

Some optical communications networks include one ingress fiber, an n-way signal coupler, and n egress fibers, where each fiber may carry signals in one or both directions. A method and apparatus for testing and monitoring data communications immediately before and after the coupler is provided. Benefits include improved ability to identify and locate system faults, and improved ability to monitor data quality and content.

15 Claims, 9 Drawing Sheets

FIG. 7 – PRIOR ART

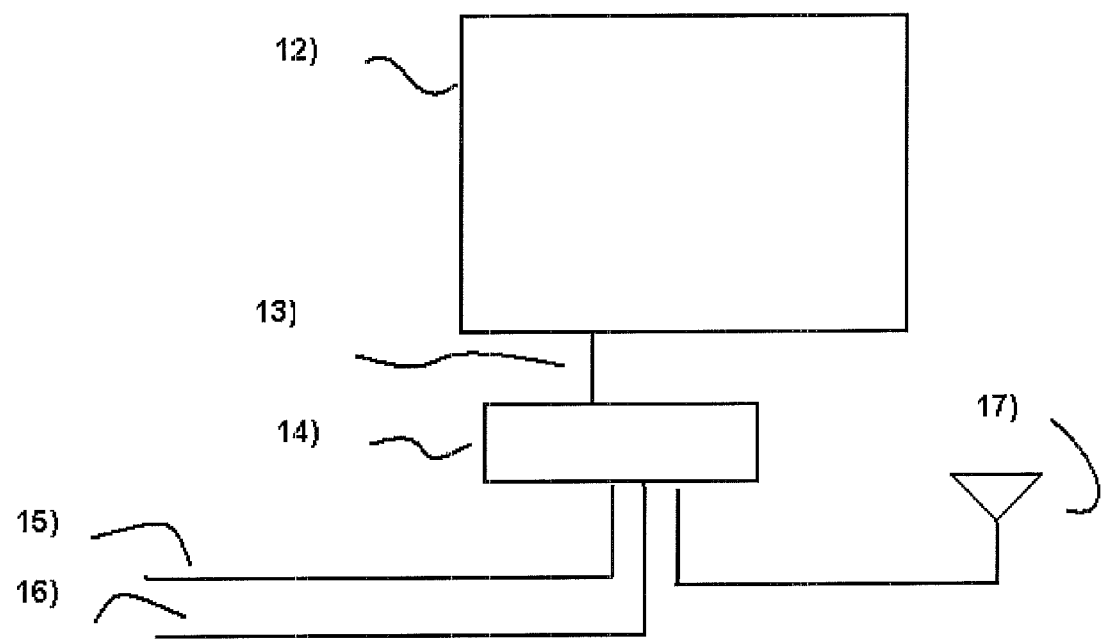
FIG. 11
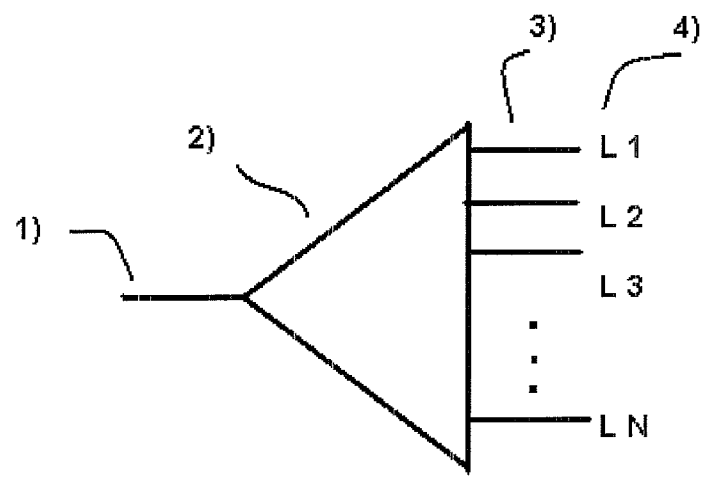
FIG. 12 – PRIOR ART

METHOD AND APPARATUS FOR TESTING AND MONITORING DATA COMMUNICATIONS IN THE PRESENCE OF A COUPLER IN AN OPTICAL COMMUNICATIONS NETWORK

FIELD

This patent document relates to a method and apparatus for testing or monitoring data communications in the presence of a coupler in an optical communications network.

BACKGROUND

Fiber optic communications is being extended for small business and home use. This provides increased bandwidth and features over that of wired or electrical connections. This is known as Fiber to the Home or FTTH or FTTx where x is home or business or some other user or subscriber or equipment. A most economic method of providing multiple houses in an area is know as Passive Optical Networks or PON. PON makes maximum use of completely passive (nonelectronic) optical devices for coupling multiple homes from a single fiber source feed. PON is seen as a way to amortize the expensive electronics over multiple users in a reliable and efficient way.

The PON method creates a situation where the end user is not exclusively connected to a single wire or fiber from the service provider's source. This is unlike the traditional telecommunications network where every subscriber is connected to a single signal circuit from the central office. This creates a problem for the operation and maintenance of PON systems in that if there is a cable cut or some other failure it cannot be determined from a central location. The failure must further be researched at the site of the PON 'coupler', alternately known as a 'splitter'.

This produces a testing or monitoring blindness that can only be resolved by physically separating each subscriber and applying test signals to determine the location and perhaps distance of a cable break.

A traditional method of determining cable fault locations in fiber optical systems is to use optical time domain reflectometery (OTDR). This method sends a signal along a fiber and detects return signals from various components on the optical path including cable breaks. This method can be carried out from a central office or along the fiber route.

A major problem with PON systems is that the coupler, which splits the signal from the source to the individual subscriber, also splits any diagnostic or OTDR signal. The result is that cable faults beyond the PON coupler are difficult or impossible to resolve using OTDR methods. If this signal loss can be overcome it is done with expensive and sensitive equipment, and accurate network records must be kept noting changes such as adding or deleting equipment or subscribers, which has a major impact on the return OTDR signal. Even with this information, practical PON OTDR may be impossible.

Referring to FIG. 7, typically a PON coupler connects a single source fiber to between 4 and 32 subscribers. The signal loss for an OTDR must account for the forward signal and reverse (reflection) loss through the coupler. For a subscriber PON split of 32, there is a minimum of approximately 38 dB of loss for the return test signal. Cable and splice losses make this worse. Any subscriber who's cable is damaged or is not terminated may swamp this low level return signal making it impossible to determine outages beyond the coupler. Test equipment manufactures suggest it is possible to use OTDR in PON systems but they state that this requires detailed records and measurements of the specific installations, cable lengths and characteristics and coupler measurements and any changes in customer or environmental conditions. These requirements are very unlikely to be implemented in any practical system. Also it is known that record keeping and data collection of changing systems introduce errors, which would further make the use of OTDR and couplers ineffective.

Another problem with OTDR methods on PON systems is that they use high-powered laser pulses to generate the test signal. This has a tendency to blind or interfere with normal communications and data being carried out on the fiber, creating multiple alarms and subscriber outages. This has a large impact on a PON system where multiple users are on the system at the same time.

One solution is to connect the OTDR to each subscriber fiber individually as shown in FIG. 2, beyond the coupler. This is time consuming, expensive and interrupts each subscriber individually for the test time.

In fiber optic systems, a coupler can be used to split or combine optical power. Couplers can also be used in these systems to divide the frequencies or wavelengths of individual fiber optic signals. In these systems the term Wave Length Division Multiplexing (WDM) or Dense WDM (DWDM) is used. The system can combine or divide by wavelength, as shown in FIG. 12, having wavelengths L1 to LN.

It is realized that a PON (Passive) system can be made of Passive WDM components and perform similar functions to enable utility. Like a PON system the test access of a WDM system typically requires the disconnection of individual fibers to gain test access. Like a PON system accessing individual fibers by disconnection is a manual process, which causes outages to wavelengths or groups of wavelengths.

SUMMARY

There is provided a method of testing or monitoring or testing and monitoring a fiber optic network in the presence of a coupler that functions as a splitter or a combiner or both. According to a preferred embodiment, the method includes a step of providing a testing or monitoring device having a control interface and at least one optical monitoring testing or monitoring interface on some or all lines proximate to the coupler forming part of the fiber optic network. Via the control interface, at least one of the coupler lines is selected for testing or monitoring purposes. The selected coupler lines are tested or monitored via the at least one testing or monitoring interface.

According to another aspect, there is provided an apparatus for testing or monitoring a fiber optic network, comprising a body having an ingress and egress for a plurality of optic fibers, control inputs, optical test or monitoring inputs and outputs, and control inputs for selecting one of the plurality of optic fibers.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 11 is a schematic diagram of an apparatus with system control and communications of test interfaces to multiple interface devices.

FIG. 12, labelled PRIOR ART, is a schematic diagram of a WDM coupler.

DETAILED DESCRIPTION OF PREFERRED EMBODIMENTS

In fiber optic systems, a coupler can be used to divide optical signals between several fibers, and a combiner can be used to combine signals from several fibers into one fiber. In these systems, a single coupler can physically perform both functions of splitting signals in one direction and combining signals in the other direction. In fiber optic systems, a coupler is also described as a splitter. In the discussion herein, the words splitter, coupler and combiner are interchangeable. In particular, the term "coupler" is used to include splitters and combiners and couplers, which may divide or combine based on optical power or optical frequency (wavelength). In addition, systems may include both power and wavelength coupling. While the discussion herein is based on a power coupler, it is understood that it will work equally well and is applicable to wavelength coupler systems or systems which utilize both wavelength and power.

The description of user, users, subscriber, end terminal or end equipment are interchangeable depending on the end use application of the method or apparatus discussed herein. In a DWDM system the end fibers may in fact be communications equipment rather than users. Equipment which is used for further communications and where the method or apparatus is used to provide a test interface or monitoring functions for which to communications equipment that has no specific end user. PON, FTTH, FTTx, or WDM systems can use couplers, which are frequency based, power based, or a combination of the two. The method and apparatus discussed herein are applicable to all of these situations. It will be understood that the method and apparatus may test, monitor, or test and monitor.

Figure 1:
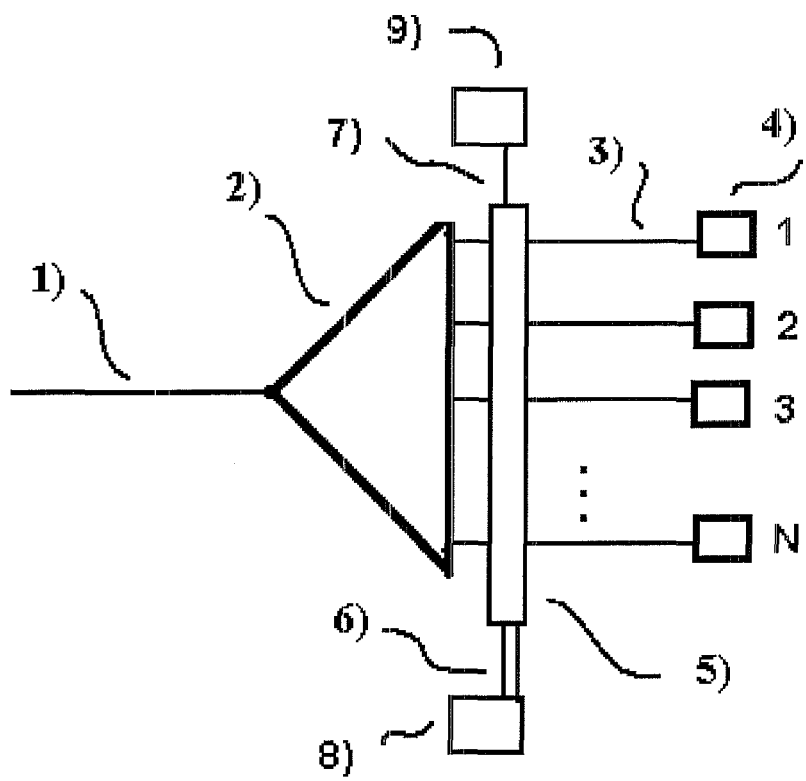
FIG. 1 is a schematic of an apparatus for testing or monitoring data communications.

Referring to FIG. 1, a test or monitoring access port is provided on or near the coupler 2. The test or monitoring access port enables local or remote access to the level of a single optical fiber 3 or subscriber for testing the final link. Fiber 3 may also be referred to as an egress fiber, and may provide unidirectional or bidirectional communication. This technology can be included in with the coupler to provide a low cost method of testing subscribers using OTDR or other forms of test equipment, and also for monitoring of active systems. Because the test or monitoring access port can be made from various technologies, including MEMS or other optical wave guiding techniques, it can be made inexpensively and reliably.

The test or monitoring access port can be completely passive, using no power in normal operation. When needed, the test or monitoring access port can be energized by a field technician to enable tests of multiple points in the field. This meets the reliability and use requirements of a PON system and other applications. This brings much higher productivity to the location of faults in a system by not requiring that each subscriber be disconnected and reconnected manually to testing equipment. Another feature is that because the subscriber cable is individually selected by the test or monitoring access port, the other subscribers are not affected as would be the case where the OTDR signals are applied to a PON splitter.

The method or apparatus can be implemented as a timed or automatic system where the test or monitoring access port can be accessed periodically for statistical testing or monitoring of complete systems.

The method or apparatus can be implemented as a remote system where the test and access port can be controlled and accessed remotely, either by sending test or monitoring signals to a remote location via fiber or other means, or by including a local test or monitoring device that is remotely controlled.

The system can be implemented where the optical test and control equipment are part of the Fiber distribution system or as added equipment.

Signals shown in the figures are illustrative only, as the signals can be bi-directional or unidirectional depending on function, time, and use.

Referring to FIG. 1, a main fiber 1 is connected to subscriber terminations 4 (labelled as 1 to N) via subscriber fibers 3 and an N-way coupler. Main fiber 1 may also be referred to as an ingress fiber, and may provide unidirectional or bidirectional communication. A monitoring/testing interface 5 is positioned on subscriber fibers 3. Interface 5 is controlled by control lines 7, and communicates with testing, source and monitoring equipment 8 via monitoring/testing test access port optical line 6. There may be one or more lines 6. A test access port controller 9 controls the test access ports via a control line 7. As used herein, test access ports refer generally to the test points on fibers 3 and the input to the test equipment. In this definition, interface 5 and optical line 6 form part of the test access port. The test point on fiber 3 may be any device which selectively provides interface 5 access to an optical signal carried on a single fiber 3. For example, interface 5 may be a static splitter, an on/off switch, a variable switch, a variable optical tap, or other suitable device that is known in the art.

Figure 2:
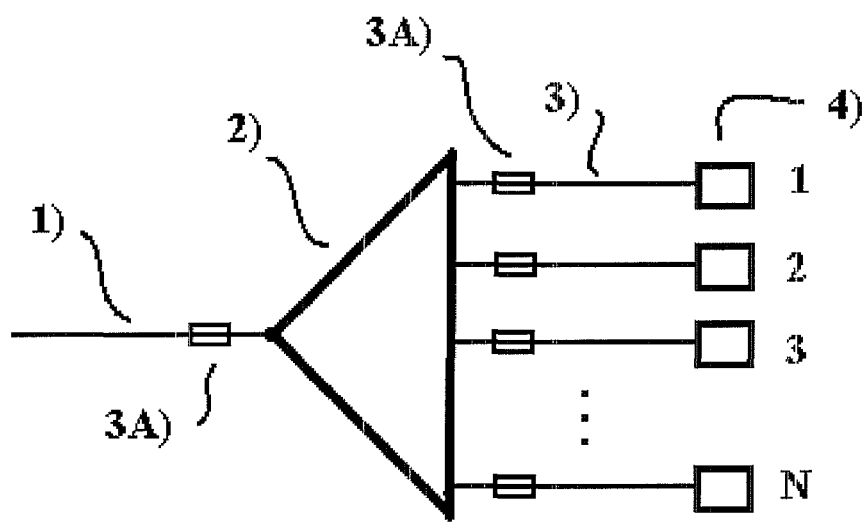
FIG. 2, labelled PRIOR ART, is a schematic of a traditional fiber coupler with connectors used for testing or monitoring.

Referring to FIG. 2, a traditional fiber coupler with connectors 3A used for testing or monitoring is shown. Subscribers, users or further equipment is often connected with several kilometers of fiber 3 down stream from the coupler 2. The testing apparatus discussed herein makes it possible to test this down stream portion. Because of the permitted test access, the standard couplers 3A are not required, such that systems may be built with Fusion splices or semi-permanent connections of high reliability rather than connectors. This method can raise the reliability and reduce operational costs and reduce points of failure (connectors) in a system.

Figure 3:
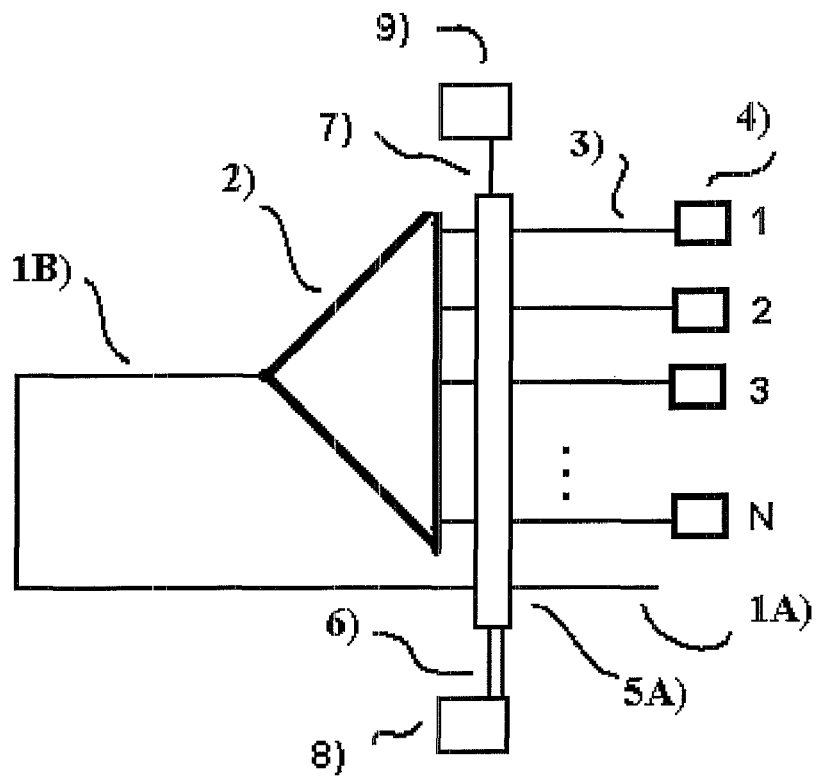
FIG. 3 is a schematic of an apparatus having a main fiber pass through a monitoring/testing interface.

FIG. 3 shows an embodiment of the apparatus with main fiber 1 passing through a monitoring/testing interface 5A. The section of main fiber 1 that is within test interface 5A is labelled 1A, and the section of main fiber that has an external connection is labelled 1B. This arrangement enables both the subscriber and the source fiber to be monitored with the same test access port.

Figure 4:
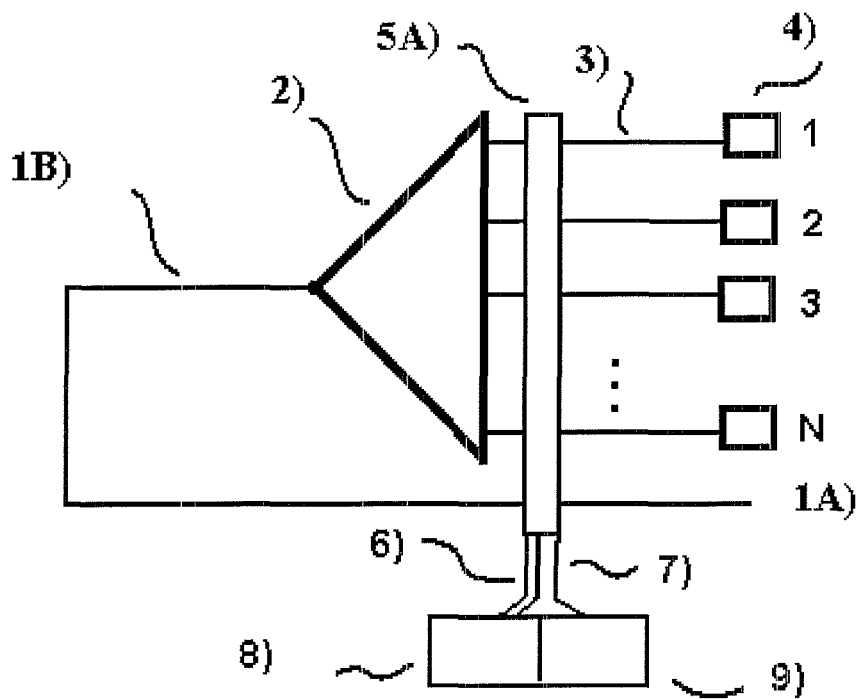
FIG. 4 is a schematic of an apparatus having the monitoring/testing measurement and control as combined elements.

FIG. 4 shows an embodiment with monitoring/testing measurement and control as combined elements. As before, optical signal lines 6 connect monitoring/testing interface 5A to the testing equipment, which, in this case, is test access port testing, source and monitoring equipment 8 combined with test access port controller optical measurement and source devices 9.

Figure 5:
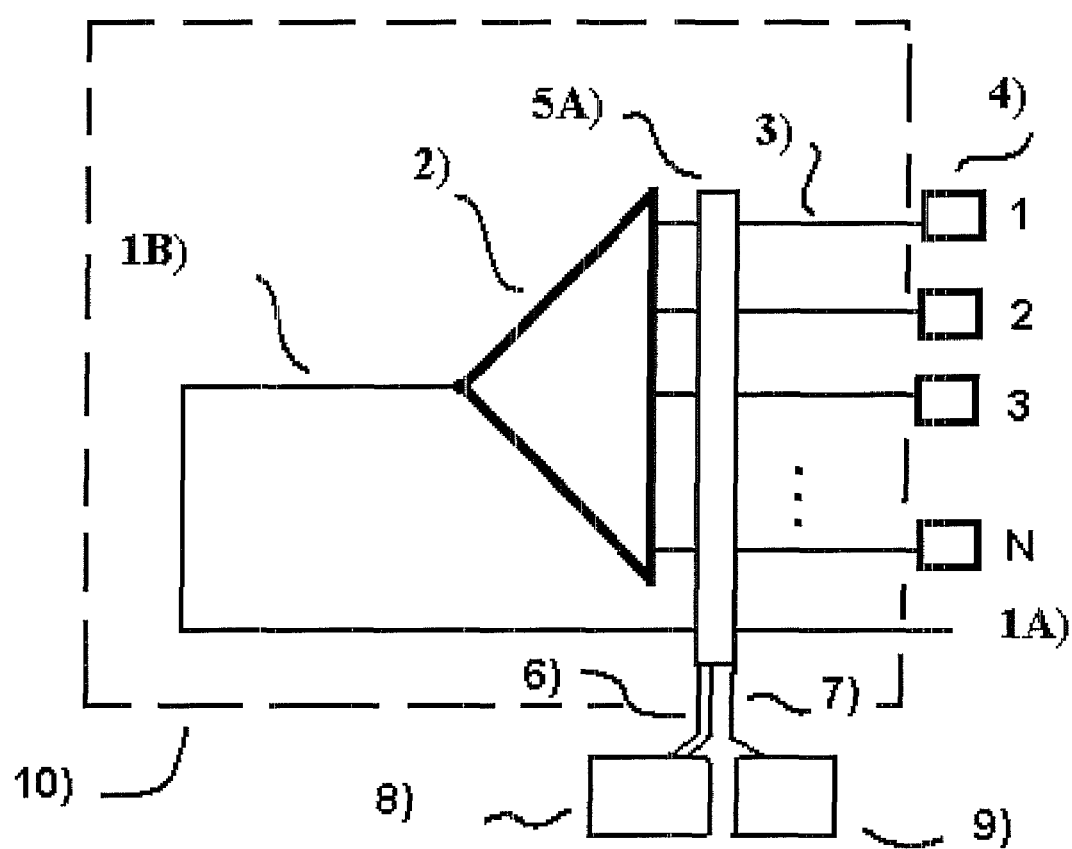
FIG. 5 is a schematic of an apparatus having a module with a coupler/splitter and a monitoring/testing access port.

FIG. 5 shows an embodiment with coupler/splitter and monitoring/testing access port as one module, indicated by reference numeral 10 with separate optical measurement devices 8 and test access controllers 9. This modular approach enables methods of access and testing which gives flexibility to the operation and test of a network. Different tests and equipment can be connected in this manner.

Figure 6:
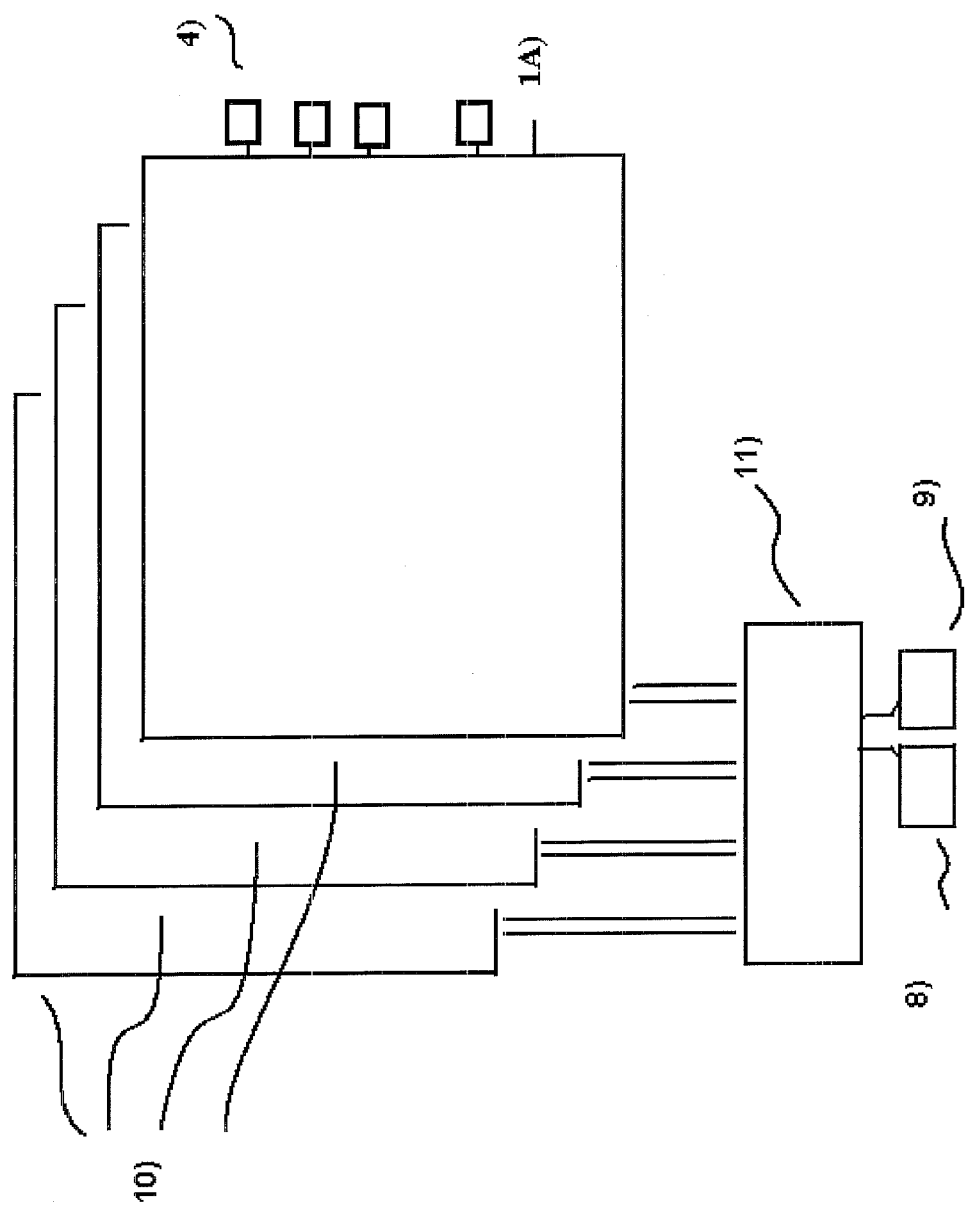
FIG. 6 is a schematic of an apparatus having multiple modules shown in FIG. 5.

FIG. 6 shows an embodiment with multiple modules 10 with an additional test interface 11 providing access to optical device 8 and control device 9. In a typical PON system, a remote installation may involve hundreds of end users, and the splitters may be housed in a single unit with modular splitters. This embodiment allows an installation to match the modularity of multiple splitters in one installation.

Figure 7:
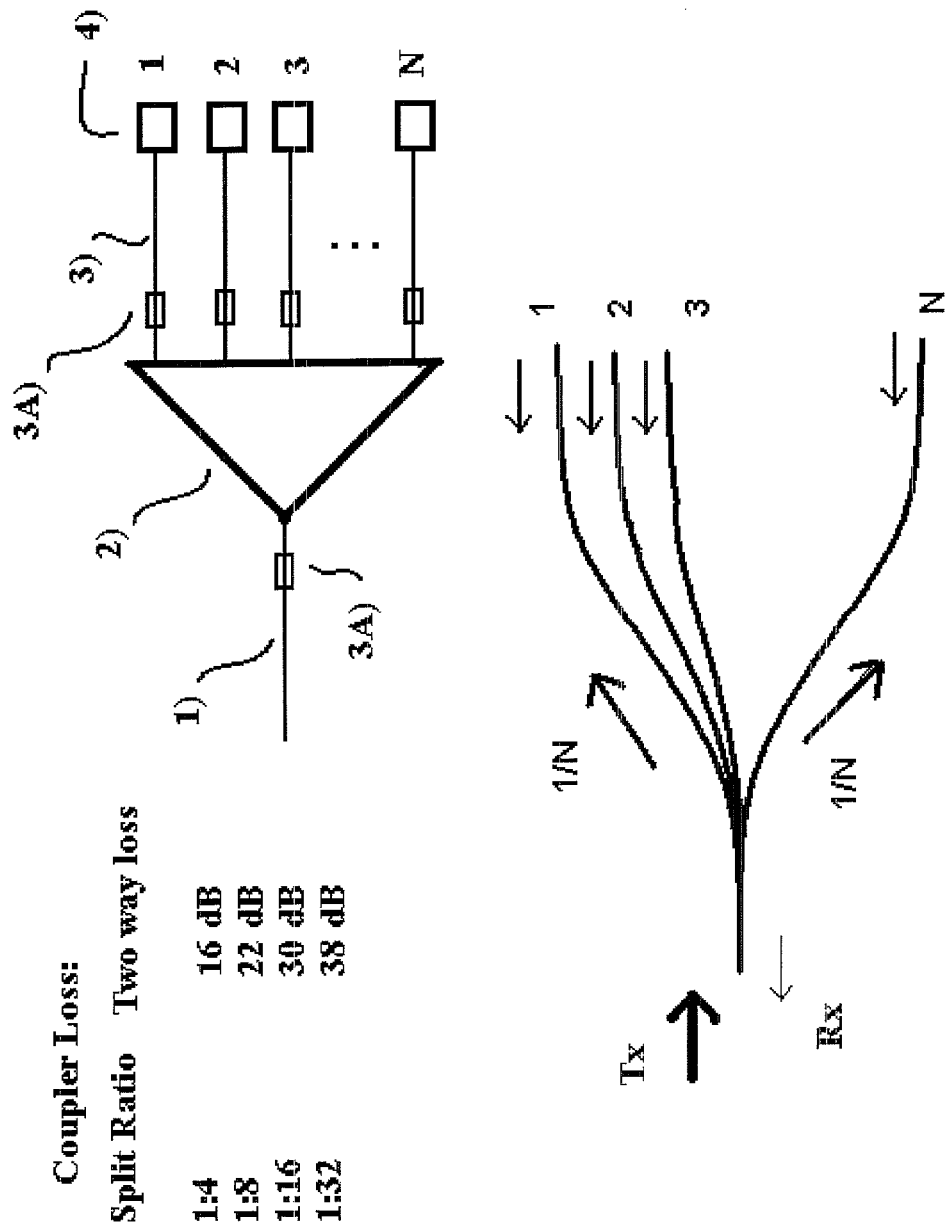
FIG. 7, labelled PRIOR ART is a schematic diagram depicting signal loss due to signals passing two ways through a coupler.

FIG. 7 depicts signal loss due to signals passing two ways through a coupler 2. The transmit signal is indicated as TX (large signal) and the return signal is indicated as Rx (small signal), from any particular end node/user. FIG. 7 also illustrates that the combined signals from multiple end nodes on a splitter produces multiple interfering signals which make testing or monitoring very difficult using prior methods. The method and apparatus described herein provides a method to gain access and testing of selected end user fibers, and thus does not have the difficulties presented by prior methods.

FIGS. 8A through 8D depicts various possible configurations of test interface 5 using optical signal lines 6, control signal lines 7, and the test signals 3A and 3B in fibers 3.

Figure 8:
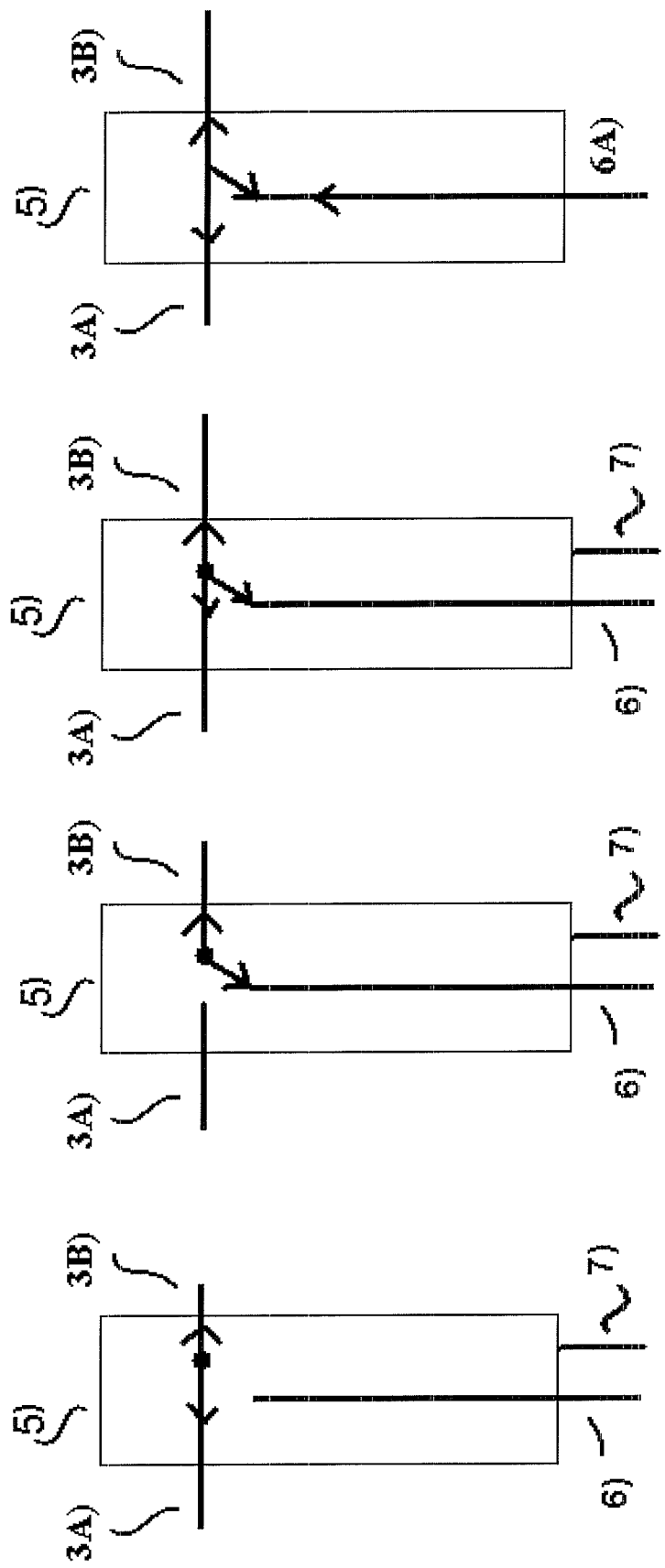
FIG. 8A is a schematic diagram of a test interface in an idle state.
FIG. 8B is a schematic diagram of a test interface in a test state.
FIG. 8C is a schematic diagram of a test interface in a partial signal selection state.
FIG. 8D is a schematic diagram of a test interface having a permanent signal taps.

FIG. 8A shows a single user condition in which the test controller 9 is disconnected or in an idle state. In this condition, the end user signals are passed through the testing interface 5 with little or no impact on the signals 3A and 3B.

FIG. 8B shows one possible configuration of test interface 5 in which the control signals 7 selectively switch test signals 3B through to optical signal line 6 from a single user for test purposes. Other nodes or user users remain in condition shown in FIG. 8A, which remains undisturbed by the testing or monitoring process. Selection of the specific fiber 3 in FIG. 1 to be tested is controlled by control signals 7. In this way, a plurality of users can remain in the condition shown in FIG. 8A while the testing condition shown in FIG. 8B or 8C can be applied to one user for testing or monitoring. The control signals can be used to select under controlled conditions what test or what sequence to cycle through various users.

FIG. 8C shows another possible configuration where test interface 5 is partially selecting user signals 3A passing to signal 3B to provide partial test signals for test equipment via optical signal 6. Selection and amount of partial signal selection is controlled by control signals 7.

FIGS. 8A through 8C show one physical implementation with different modes of operation of the same setup. FIG. 8D shows another possible configuration where the test interface 5 provides a permanent partial signal interface to the optical signal line 6. In this case, there is no control required of the partial signal. The test tap interface of FIGS. 8A through 8D may be implemented in various means including MEMS, electro-optic materials, polymer devices.

Figure 9:
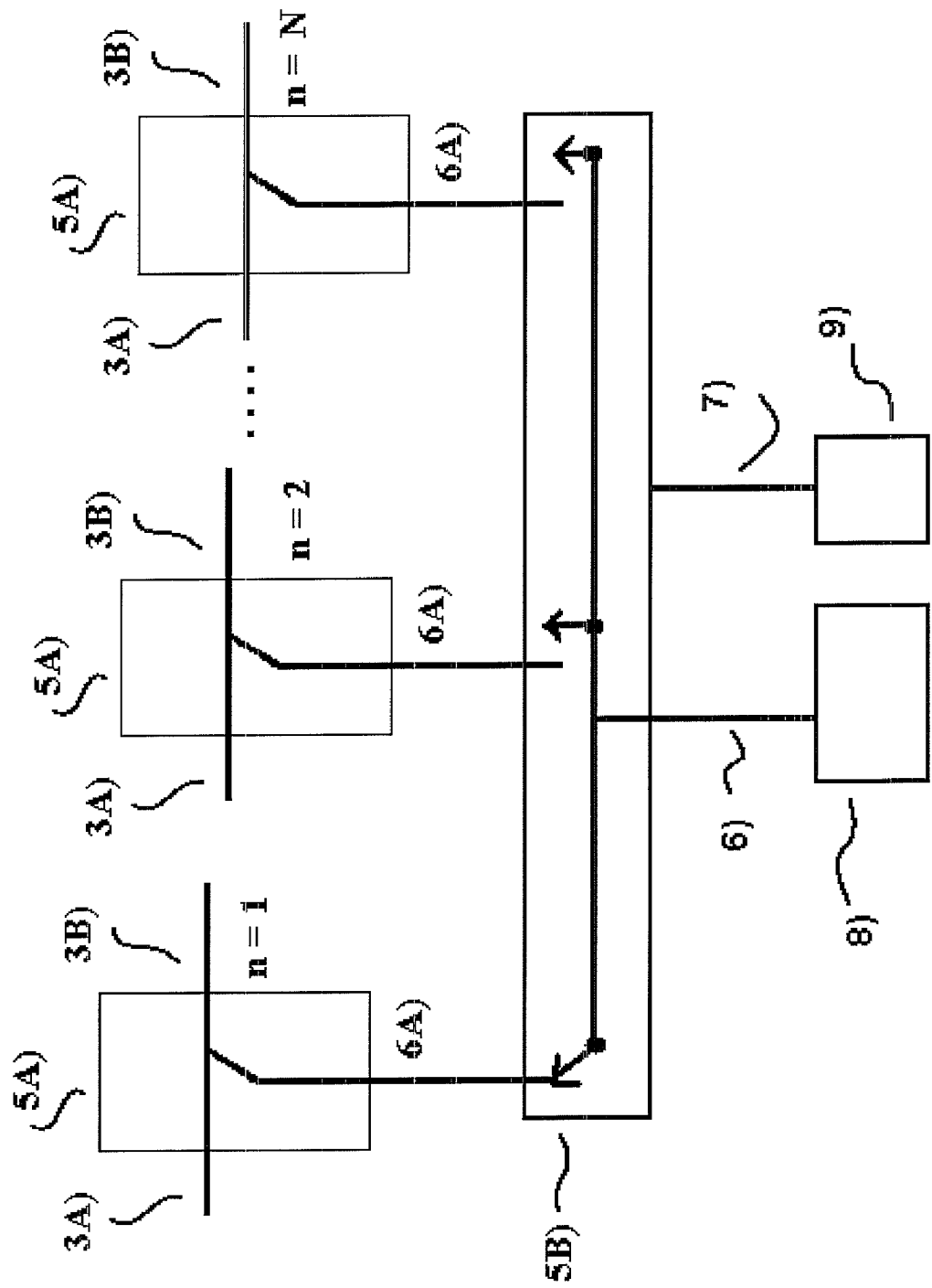
FIG. 9 is a schematic diagram of an apparatus having permanent taps shown in FIG. 8D.

FIG. 9 shows another embodiment with a configuration using permanent taps as used in FIG. 8D with the addition of a test access selector 5B. Test access selector 5B is similar to test access selector 5A. Test access selector 5A interfaces the fiber 3 with test access selector 5B, which in turn interfaces the testing device 8 through optical lines 6. Test access selector 5B is controlled by controller device 9 via signals lines 7. In FIG. 9, the first user 4 (n=1) is interfaced to the test equipment 8 while the other users are in no-testing or no-monitoring mode.

It will be noted that the monitoring or testing devices 5, 5A and 5B may be specific sub elements which select a line to test based on a signal, or they may be a larger system that incorporates the sub-elements, depending on the design requirements of the user.

Figure 10:
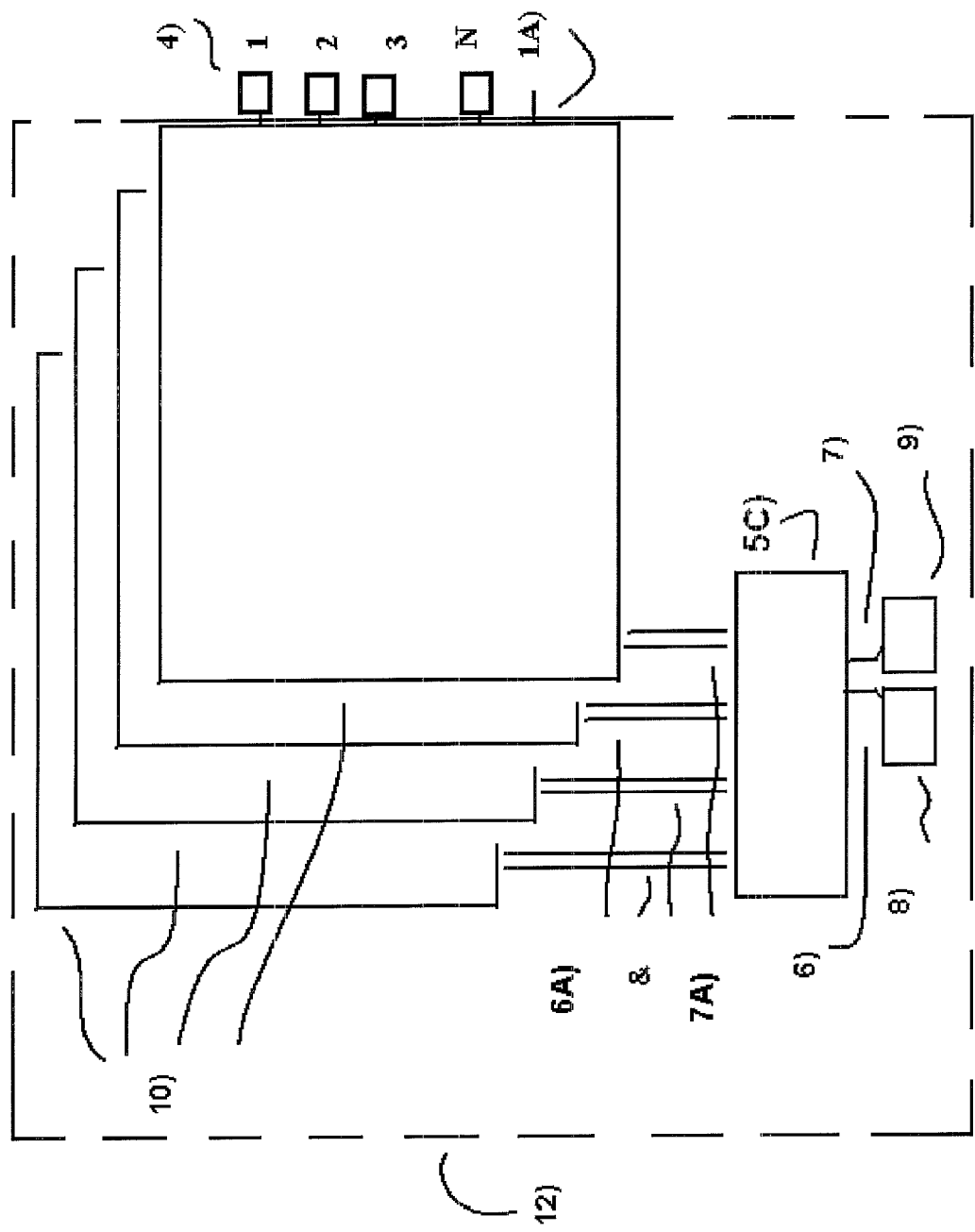
FIG. 10 is a schematic diagram of an apparatus having multiple test interfaces controlled by a controller and interfaced through individual sub-interfaces.

FIG. 10 shows a system 12 with multiple test interfaces controlled by a controller 9 and interfaced through to individual sub interfaces 10 using a test access selector 5C, which passes both test signals 6 and control signals 7 to the appropriate sub interfaces 6A and 7A, similar to the function of test access selectors 5A and 5B.

FIG. 11 shows an embodiment with system control and communications of test interfaces 12 to multiple interface devices 14. Communication and control occurs between outside communications devices 15, 16, 17 and internal test interfaces through link 13. Communication interfaces of various means are possible, such as a wire connection 15, a fiber optic connection, and a wireless connection 17.

We claim:

1. A method of testing or monitoring or testing and monitoring a fiber optic network having a frequency range, comprising:
   providing a controller and at least one network interface, the network interface comprising at least one coupler on more than one network line of the fiber optic network, each coupler at least one of a splitter, a tap or a switch;
   using the controller to select at least one of the network lines; and
   testing or monitoring the selected network lines via the network interface by coupling a test signal from the fiber optic network to the controller, and the test signal having a frequency range that comprises the frequency range of the fiber optic network.

2. The method of claim 1, further comprising a step of providing the network interface with an active mode and a passive mode, in the passive mode the network interface having negligible impact on the passage of light through the network lines and in the active mode the network interface interacting with at least a portion of the optical signal on the selected network lines.

3. The method of claim 2, further comprising a step of providing the active mode with at least two settings with which to interact with the optical signal, in the first setting the testing or monitoring interface interacts with all of the optical signal and in the second setting the testing or monitoring interface interacts with a selected portion of the optical signal.

4. The method of claim 1, wherein testing or monitoring the selected network lines comprises continuously sampling the network lines.

5. The method of claim 1, further comprising a step of performing optical power measurements.

6. The method of claim 1, further comprising a step of performing optical power measurements at specific optical wave lengths.

7. The method of claim 1, further comprising a step of synchronizing the testing or monitoring with time coded signals passing along the selected network lines.

8. The method of claim 1, further comprising a step of sequential testing or monitoring of each of the network lines.

9. An apparatus for testing or monitoring or testing and monitoring a fiber optic network having a frequency range, comprising:
   a controller;
   at least one network interface, the network interface comprising at least one coupler on more than one network line of the fiber optic network, each coupler comprising at least one of a splitter, a tap or a switch, each coupler coupling a test signal having a frequency range that comprises the frequency range of the fiber optic network;
   each coupler having an ingress and egress for a plurality of optic fibers, control inputs, optical test or monitoring inputs and outputs, and control inputs for selecting one of the plurality of optic fibers.

10. The apparatus of claim 9, wherein the controller has a human interface which connects to the control inputs.

11. The apparatus of claim 9, wherein the controller has a remote monitoring interface connected to the control inputs and the monitoring inputs and outputs of the coupler.

12. The apparatus of claim 9, wherein the controller is connected to multiple couplers in the network interface.

13. A method of testing or monitoring or testing and monitoring a fiber optic network having a frequency range, the fiber optic network having a passive coupler, the passive coupler coupling an ingress optical fiber to more than one egress optical fiber, the method comprising the steps of:
   providing a test access port having a coupling end and a testing end, the coupling end being connected to two or more egress optical fibers and the testing end being connected to a testing device;
   controlling the test access port to selectively provide test access to at least one of the two or more egress optical fibers; and
   testing the selected network lines via the at least one testing device by coupling a test signal having a frequency range that comprises the frequency range of the fiber optic network.

14. The method of claim 13, wherein the test access port comprises an interface for selectively accessing at least one of the two or more egress optical fibers, the interface being controlled by a controller.

15. An apparatus for testing or monitoring or testing and monitoring a fiber optic network having a frequency range, the fiber optic network having a passive coupler, the passive coupler coupling a ingress optical fiber to more than one egress optical fiber, comprising:
   a test access port having a coupling end and a testing end, the coupling end being connected to two or more egress optical fibers and the testing end being adapted to connect to a testing device; and
   a controller connected to the test access port for controlling the test access port to selectively access at least one of the two or more egress optical fibers to obtain a test signal, the test signal having a frequency range that comprises the frequency range of the fiber optic network.

* * * * *